United States Patent [19]

Kawahara et al.

[11] Patent Number: 4,584,741
[45] Date of Patent: Apr. 29, 1986

[54] CLASPING DEVICE

[75] Inventors: Akira Kawahara, Kagawa; Akihiko Chiba, Takamatsu, both of Japan

[73] Assignee: Ryusyo Industrial Co., Ltd., Osaka, Japan

[21] Appl. No.: 756,381

[22] Filed: Jul. 18, 1985

[30] Foreign Application Priority Data

Jul. 25, 1984 [JP] Japan ................ 59-156292

[51] Int. Cl.⁴ ............................................. A44B 21/00
[52] U.S. Cl. ................... 24/68 CD; 24/68 R; 24/69 ST; 24/71.2; 254/217
[58] Field of Search ............ 24/68 CD, 68 R, 69 ST, 24/69 CT, 71.2, 71 R, 71 T, 71 ST; 254/217, 218; 294/74, 75; 74/544

[56] References Cited

U.S. PATENT DOCUMENTS

| | | | |
|---|---|---|---|
| 2,442,266 | 5/1948 | Davis | 24/68 CD |
| 2,506,029 | 5/1950 | Maasdam | 254/218 |
| 2,867,406 | 1/1959 | Davis | 24/68 CD |
| 3,050,799 | 8/1962 | Davis | 24/68 CD |
| 3,178,785 | 4/1965 | Jellison | 24/68 CD |
| 4,054,971 | 10/1977 | Kawahara | 24/68 CD |
| 4,451,956 | 6/1984 | Kawahara | 24/68 CD |
| 4,527,309 | 7/1985 | Kawahara | 24/68 CD |

Primary Examiner—Victor N. Sakran
Attorney, Agent, or Firm—Wenderoth, Lind & Ponack

[57] ABSTRACT

A clasping device which has a main assembly including a body, and a lever connected by means of links. A first hook is connected with the body, while a second hook is connected with the lever by means of a strap. The strap can be tightened and loosened by rotating the lever between the release and tightening positions. The body has a claw member for temporarily holding the tightened strap. Therefore, by utilizing the claw member, the lever can be repeatedly operated in order to increasingly tighten the strap.

3 Claims, 20 Drawing Figures

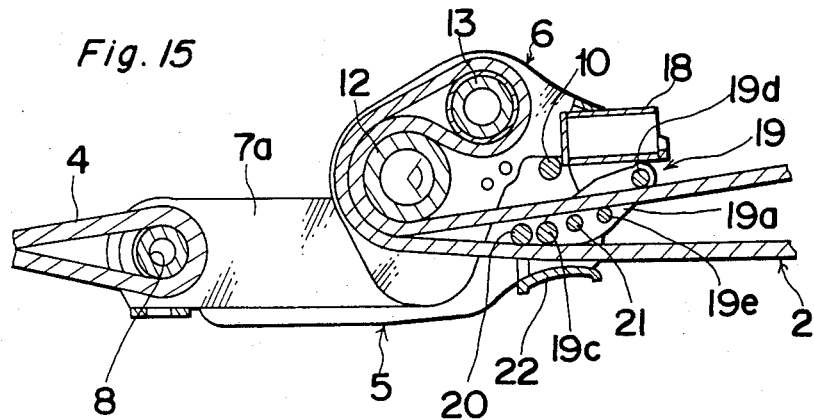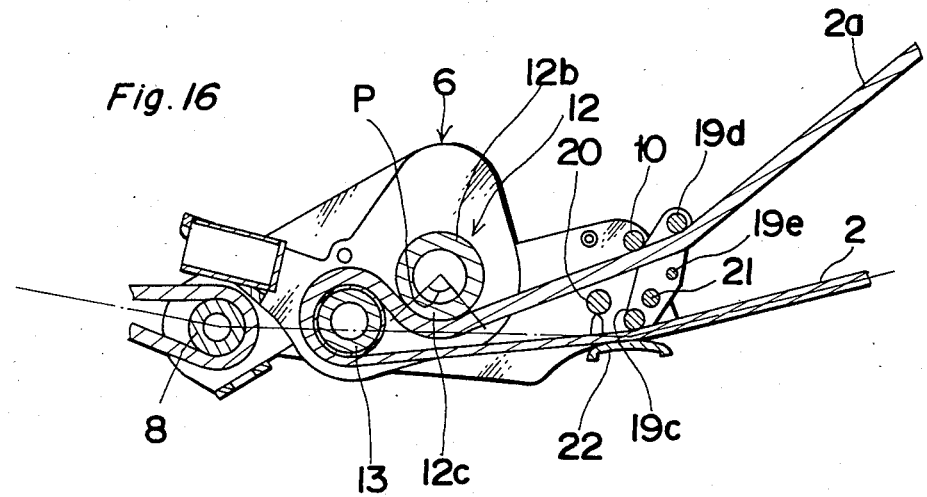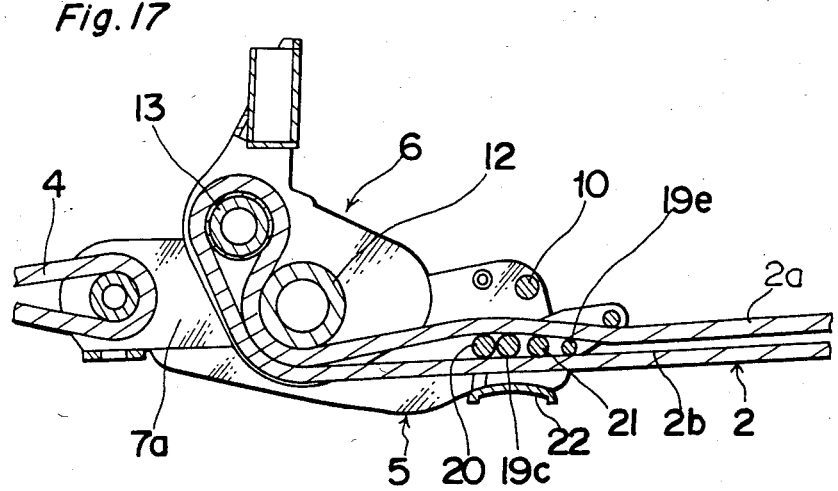

CLASPING DEVICE

BACKGROUND OF THE INVENTION

1. Field of the invention

The present invention generally relates to a clasping device for fixing a cargo item on a base by means of a strap or for tightening a strap turned around the cargo item and, particularly, to a clasping device durable against a large load such as a large size automobile and including a means for temporarily holding the strap, having been tightened by a first tightening operation of a lever, to increasingly tighten the strap by further tightening operation of the lever.

2. Description of the prior art

The inventor of the present invention has previously provided a clasping device of this type, which is described in first Japanese patent publication No. 15679/1983 (corresponding to U.S. patent application Ser. No. 474,638 and EPC patent application No. PCT/JP82/00268, is compactly assembled and preferably used for the purpose of fixing the large size automobile of, for example more than ten tons, on a deck aboard a ship. The construction of the above clasping device will be briefly described hereinbelow with reference to FIGS. 1 to 3.

The clasping device has a clasping main assembly A which includes a body 5 and a lever 6 pivotally connected with the body 5 by means of a pair of links 7a and 7b, a first connecting member A' connected with the body 5, and second connecting member A" connected with the lever 6. The connecting members A' and A" can be tightened and released by rotating the lever 6 with respect the body 5. The body 5 has a pair of sidewalls 5a and 5b facing each other. The lever 6 has a pair of sidewalls 6a and 6b facing each other, a strap turning shaft 13 and strap pressing shaft 12 respectively extending between the pair of sidewalls 6a and 6b. The pair of links 7a and 7b respectively have first end portions pivotally connected, by means of pivot shafts 14a and 14b with the corresponding sidewalls of the lever 6 at positions externally of the lever 6, and second ends portions pivotally connected, by means of a connecting shaft 8, with the first end portions of the corresponding sidewalls 5a and 5b of the body 5 at positions internally of the body 5. The first connecting member A' has a first hook 1a connected, by means a connecting member 4, with the connecting shaft 8. The second connecting member A" includes a strap 2 having one end portion connected with a second hook 1b, and the other end portion 2a connected with the lever 6 so as to be inserted between the pair of sidewalls 6a and 6b of the lever 6 externally turned around the strap turning shaft 13 after having past the strap pressing shaft 12 and led to the outside past the strap pressing shaft 12. Accordingly, when the lever 6 is turned from a release position, as shown in FIG. 3, to a tightening position, as shown in FIGS. 1 and 2, the strap turning shaft 13 and the strap pressing shaft 12 are also turned around the pivot shafts 14a and 14b to tighten the strap 2.

The feature of the above clasping device is such that it has the pair of links 7a and 7b. Thus, when the lever 6 is rotated to the tightening position, the pivot shafts 14a and 14b move in such a direction that they sink, that is, move between the sidewalls 5a and 5b of the body, with the result that the lever 6 can be accommodated compactly inside the body 5 while the lever 6 is in the tightening position.

However, the clasping device as described above has such a disadvantage that the lever 6 can be basically rotated only one time from the release position to the tightening position, that is to say, the strap 2 can not be increasingly tightened by repeatedly operating the lever 6 between the release and tightening positions more than one time. In order to increase the intensity of the tension of the strap 2, it is necessary to hold the strap 2 having been tightened by the first operation of the lever 6 so that second operation of the lever 6 can be conducted. However, it is very difficult to hold the strap 6 in a tightened manner because that the intensity of the tension given to the strap 2 is extremely large. It is to be noted that, regarding the clasping devices of this type, if the strap 2 is relatively long, the strap 2 can not be sufficiently tightened to ensure the fixing the objects.

SUMMARY OF THE INVENTION

It is, therefore, an object of the present invention to provide a clasping device of a type of having a clasping main assembly thereof including a body, and a lever connected with the body by means of a pair of links, wherein a strap connected with the lever can be increasingly tightened by repeatedly operating the lever between the release and tightening positions, and furthermore the operation of the lever can be conducted by relatively small force.

In accomplishing these and other objects, according to the present invention there is provided an improvement of a clasping device of a type in which a clasping main assembly thereof comprises a body and a lever connected with the body by means of a pair of links.

The improvement comprising a first connecting shaft for connecting the second end portions of the links with the corresponding sidewalls of the body at predetermined positions; shaft means for connecting the second end portions of the links with the corresponding sidewalls of the body at such positions between the first end portions of the links and the first connecting shaft that the shaft means takes a position offset from a substantially straight tension line, formed when the strap is tightened and passing through the axes of the first connecting member and the pivot shafts, toward a side opposite to the other side where the strap pressing shaft locates when the lever takes the tightening position; a second connecting shaft extending between the pair of sidewalls of the body at second end portions opposite to the first end portion; and a claw member rotatably mounted on and between the pair of sidewalls of the body at the second end portions so that the strap passes through a space between the claw member and the second connectiong shaft and so that the claw member may press the strap against the second connecting member to hold the strap therebetween.

With the construction of the improvement of the clasping device, after that a first operation of the lever for tightening the strap is finished and subsequently the tightened strap is held between the claw member and the second connecting shaft, the lever can be moved from the tightening position to the release position with the strap held in the tightened condition. Thus, the second operation of the lever can be subsequently conducted to further tighten increasingly the previously tightened strap. Furthermore, since the first connecting shaft is a member different from the shaft means and the shaft means takes such positions as being offset from a substantially straight tension line toward said side, when the lever is located at the release position for the purpose of second tightening operation after the completion of the first tightening operation, the shaft means is urged, in general upwardly, so as to become close to the tension line due to the intensity of the tension given to the strap. Accordingly, the lever is lifted in the body from the lowermost position, so that the strap pressing shaft is held in a relatively high position with respect the strap turning shaft, with the result that the strap pressing shaft is prevented from strongly pressing the layered portion of the strap between the strap turning shaft and the second connecting shaft so that the upper and lower portions of the layerd strap portion become free from each other. Therefore, the second end portion of the strap can be manually easily pulled to tighten the part between the portion held by the claw member and the second end portion previously before the second tightening operation of the lever is conducted.

Said claw member is preferably comprises a third connecting shaft extending between the pair of sidewalls of the body at the second end portion thereof; a pair of sideplates rotatably mounted on the third connecting shaft, a strap pressing bar extending between the pair of the sidewalls at first end portions thereof, and a pair of forth and fifth connecting members respectively extending between the pair of sidewalls at second end portions opposite to the first end portions with respect the third connecting shaft, the second end portion of the strap passing between the forth and fifth connecting members. With this construction of the crow member, the crow member can be easily rotated in any direction by handling the second end portion of the strap. That is to say, when the second end portion of the strap is upwardly lifted to push the forth connecting shaft, namely the upper shaft above the strap, the claw member is easily rotated around the third connecting shaft so that the strap pressing bar press the strap against the second connecting shaft. On the contrary to the above, when the second portion of the strap is downwardly depressed to push the fifth connecting member, namely the lower shaft or release shaft, the claw member can be easily rotated around the third connecting shaft to release the claw from the strap and the second connecting shaft.

BRIEF DESCRIPTION OF THE DRAWING

The above objects and features of the present invention will become apparent from the following description taken in conjunction with the preferred embodiment thereof, with reference to the accompanying drawings, in which:

FIG. 15 is a sectional view of the clasping device shown in FIG. 14, the lever being at the tightening position, FIG. 16 is a sectional view of the clasping device shown in FIG. 14, the lever being at the release position, while a claw member being at a stop position;

FIG. 17 is a sectional view of the clasping device shown in FIG. 14, the lever and claw member respectively being at the release position; and, FIG. 18 is a sectional view taken along a line XVIII—XVIII in FIG. 14.

DETAILED DESCRIPTION OF THE INVENTION

Figure 1:
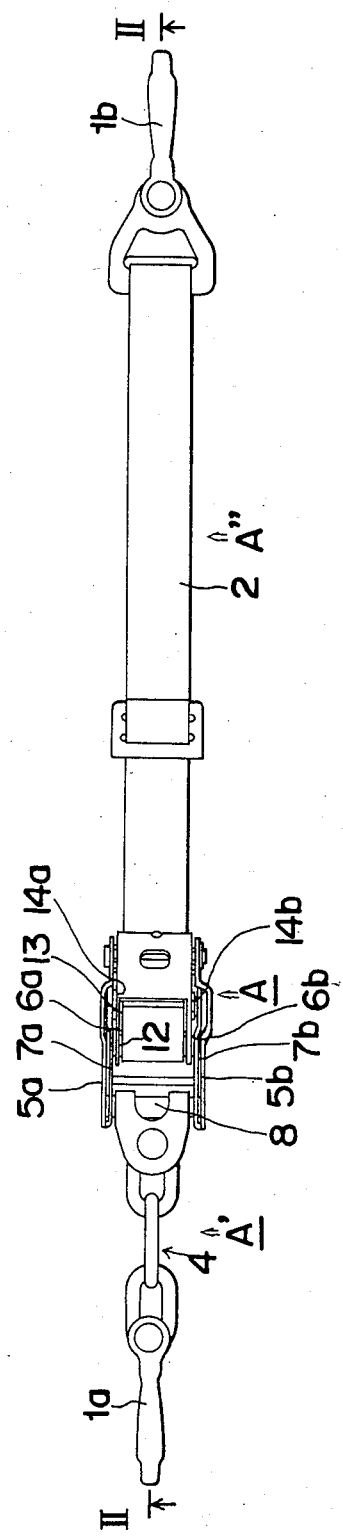
FIG. 1 is a top plan view showing a clasping device according to a prior art, as already described hereinbefore.

Before the description of the present invention proceeds, it is to be noted that like parts are designated by like reference numerals and symbols throughout the several views of the accompanying drawings.

Figure 4:
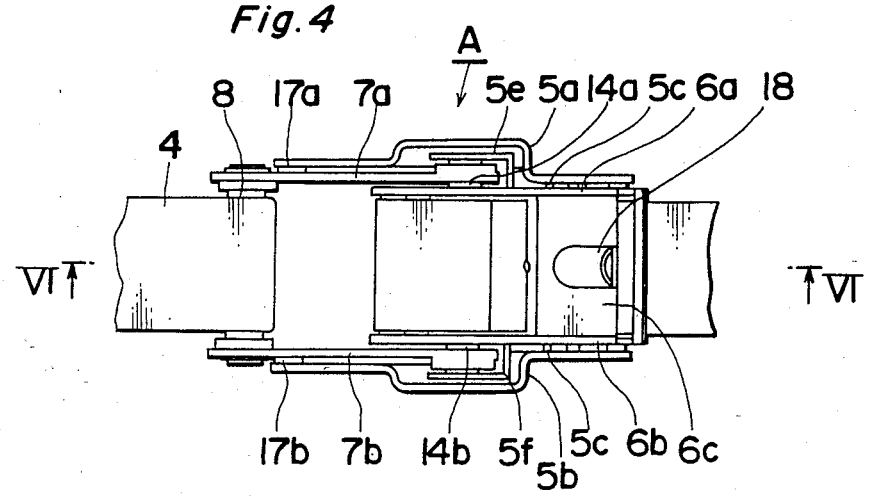
FIGS. 4 and 5 are a top plan view and a side elevational view of a clasping device according to a preferred embodiment of the present invention.
Figure 5:
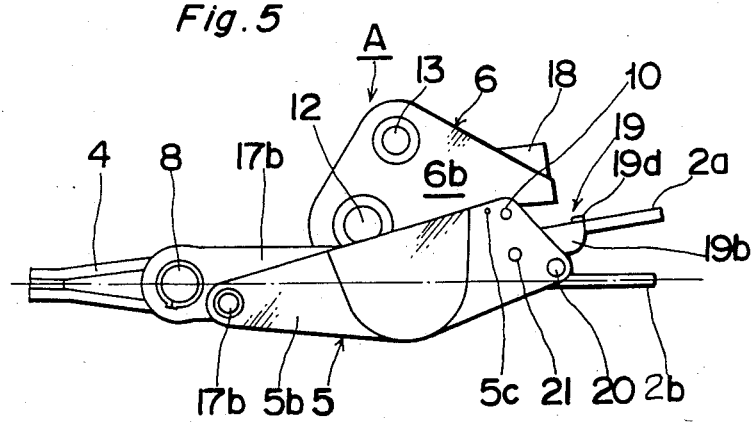
Figure 6:
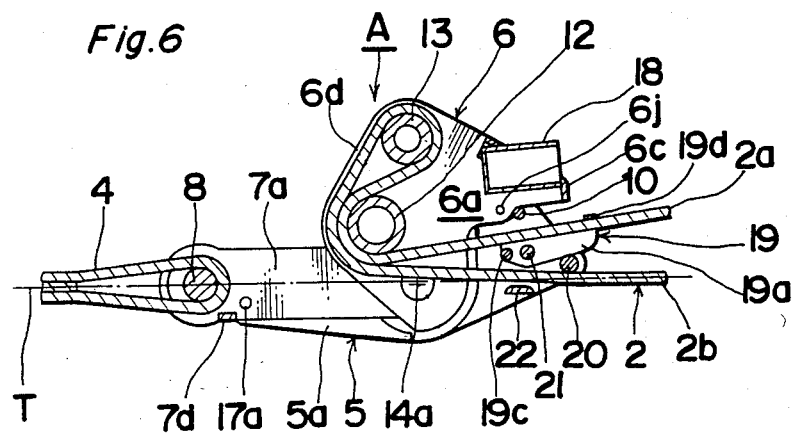
FIG. 6 is a sectional view taken along a line VI—VI in FIG. 4.

Referring to FIGS. 4, 5 and 6 there is seen a clasping device according to one preferred embodiment of the present invention, a lever 6 of clasping main assembly A thereof being at the tightening position.

The clasping main assembly A essentially comprises a body 5 and said lever 6 connected with the body 5 by means of a pair of links 7a and 7b.

The body 5 includes a pair of sidewalls 5a and 5b facing each other between which a plurality of shafts 10, 20, 21 and 22 are arranged at horizontally and vertically different positions. A pair of connecting shafts 20 and 22 are located at the right end portion of the body 5 and form therebetween a space through a strap 2 passes. One of the shafts 20 takes a position slightly above and right to the other shaft 22. Furthermore, the connecting shaft 10 is located above the shafts 20 and 22 for the purpose of positioning the lever 6 at the predetermined tightening position. Still further, the final connecting shaft 21 is located between the connecting shafts 10 and 22 for the purpose of rotatably supporting a claw member 19 between the pair of sidewalls 5a and 5b.

Figure 8:
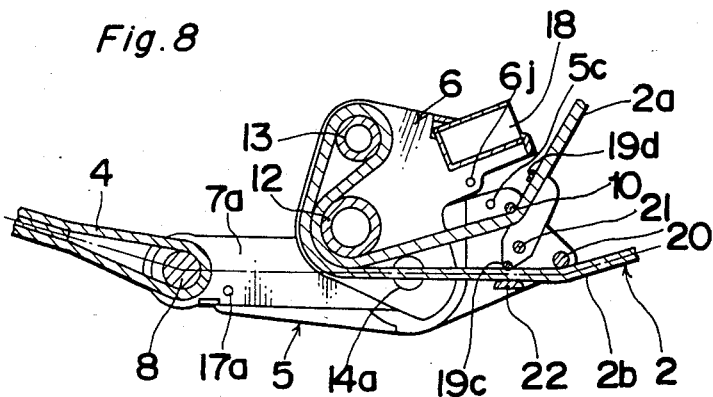

The claw member 19, for temporarilly holding the tightened strap 2, has a pair of longitudinal sideplates 19a and 19b facing each other between which a connecting shaft 19d is arranged at outer end portion thereof, while a strap pressing bar 19c is arranged at inner end portion thereof. The sideplates 19a and 19b are rotatably mounted on the connecting shaft 21 so as to rotate between the release position as shown in FIG. 6 and the stop position as shown in FIG. 8. When the claw member 19 takes the release position, the strap pressing bar 19c departs from the strap 2, while the outer end portions of the side plates 19a and 19b is stopped by the connecting shaft 20. Meanwhile, when the claw member 19 takes the stop position, the strap pressing bar 19c presses the corresponding portion 2b of the strap 2 against the connecting shaft 22.

Figure 2:
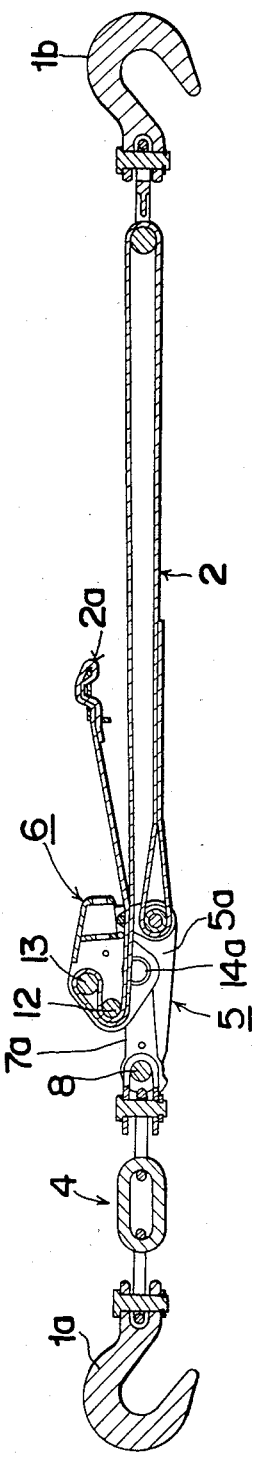
FIG. 2 is a sectional view taken along a line II—II in FIG. 1.
Figure 3:
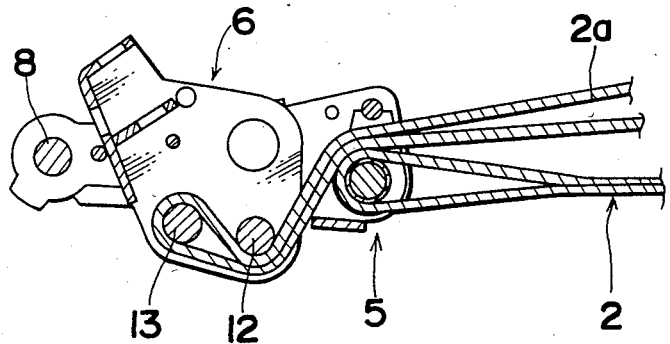
FIG. 3 is a partial section of the clasping device shown in FIGS. 1 and 2, but the lever being located at the release position.

The body 5 is connected with the pair of links 7a and 7b such that the left end portion thereof of the pair of sidewalls 5a and 5b are rotatably connected with the left end portions, i.e. the second end portions, of the links 7a and 7b by means of a pair of pivot shafts 17a and 17b. A connecting shaft 8 is also mounted on the second end portions of the links 7a and 7b. One end of a connecting member, namely a strap 4 is connected with the connecting shaft 8, while the other end of the strap 4 is connected a first hook (not shown but similar to the first hook 1a in FIG. 1). It is to be noted, here, that the relationship of the positions of the pivot shafts 17a and 17b and the connecting shaft 8 is quite important. Namely, on the assumption that the lever 6 is located at the tightening position and the straps 2 and 4 are pulled along a straight tension line T passing through the axes of the shaft 8 and pivot shaft 14a and 14b for connecting the links 7a and 7b and the lever 6, as shown in FIGS. 1, 2 and 3, the pivot shafts 17a and 17b takes a position downwardly offset from the tension line T. In addition, a connecting bar 7d is arranged between the second end portions of the pair of links 7a and 7b to reinforcing the links.

The lever 6 has said pair of sidewalls 6a and 6b, and a connecting wall 6c for connecting the sidewalls 6a and 6b with each other. The right end portions, i.e. the first end portions of the links 7a and 7b are pivotally connected, by means of pivot shafts 14a and 14b, with the corresponding sidewalls 6a and 6b of the lever 6 at positions externally of the lever 6. More specifically, each of the sidewalls 6a and 6b has an L-shaped art 5e and 5f at externally thereof. The second end portions of the links 7 are respectively inserted in the sapces between the sidewalls 6a and 6b and the arms 5e and 5f and subsequently are pivotally supported by the pivot shafts 14a and 14b which extend between the sidewalls 6a and 6b and the arms 14a and 14b.

The lever 6 has a strap pressing shaft 12 and a strap turning shaft 13 between the sidewalls 6a and 6b. The end portions of the shafts 12 and 13 are fixed on the corresponding sidewalls 6a and 6b at positions offset inwardly from the edge thereof so that a strap guiding flange portion 6d is formed around the shafts 12 and 13. In addition, the connecting wall 6d has a cylinder 18 fixed thereon, which has a bore for receiving an end portion of a fastening rod (not shown). The lever 6 is operated by means of the fastening rod so as to rotate between the tightening and release positions.

The strap 2 has one end portion, i.e. a first end portion 2b with which a hook (not shown but similar to the hook 1b in FIG. 1) is connected, and the other end portion, i.e. a second end portion 2a connected with the shafts 12 and 13 in such a manner that the second end portion 2a is, first, inserted between the shafts 20 and 22 supported by the pair of sidewalls 6a and 6b of the lever 6 externally thereof, turned around the strap turning shaft 13 after having past the strap pressing shaft 12 and led to the outside past the strap pressing shaft 12 and through the space between the shafts 19d and 21. Accordingly, as shown in FIG. 6, the strap 2 is double-structured at the strap pressing shaft 13.

In addition, the sidewalls 5a and 5b respectively have anchor projections 5c, at predetermined position thereof, which project inwardly to engage holes 6j formed in the sidewalls 5a and 5b of the body 5 when the lever 6 takes the tightening position. Accordingly, even when the tightening main assembly A is oscillated, the lever 6 is stably held at the tightening position with respect to the body 5.

The increasingly tightening operation of the clasping device having such construction as descrived above is, hereinafter, described in detail with reference to FIGS. 7 to 13.

Figure 7:
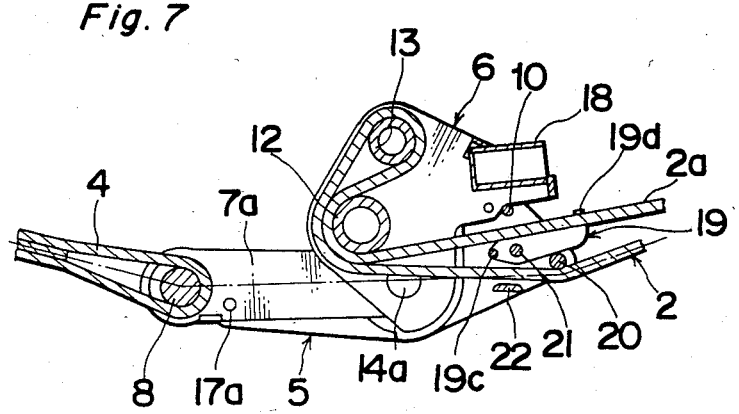
FIGS. 7 to 13 views similar to FIG. 6 and illustrating in turn the operation of increasingly tightening the strap.
Figure 9:
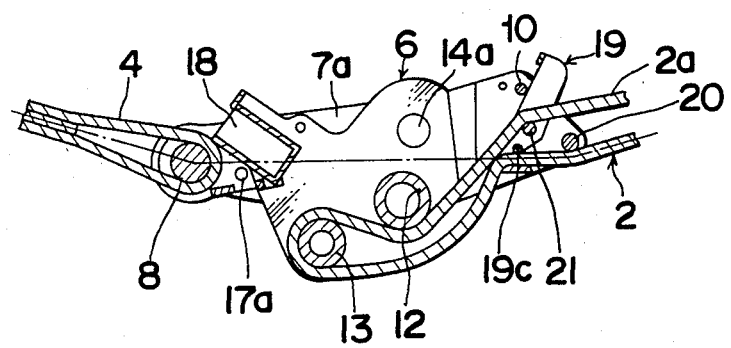
Figure 11:
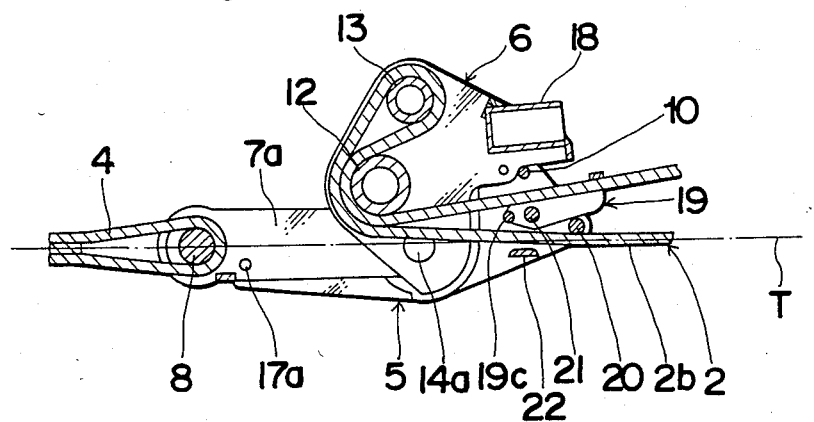

Referring to FIG. 7 which illustrates a condition in which the first tightening operation of the lever 5 has been completed but the straps 2 and 4 are not still pulled sufficiently to align along the straight tension line T which is seen FIGS. 6 and 11. In order to further tighten the straps 2 and 4, subsequently, the second end portion 2a of the strap 2 is lifted as shown in FIG. 8 so that the connecting shaft 19d of the claw member 19 is upwardly moved, and accordingly, the entire claw member 19 is rotated counterclockwise, with the result in that the strap pressing bar 19c presses the lower portion 2b of the strap 2 against the connecting shaft 22 to hold the tighten strap 2. Subsequently, the lever 6 is rotated from the tightening position to the release position as shown in FIG. 9, with the result that the lower portion 2b of the strap 2 is slightly moved to right direction to slightly be loosened so that the claw member 19 is further rotated counterclockwise since the strap pressing bar 19c is retracted by the movement of the said portion 2b of the strap 2 to further strongly press the portion 2b of the strap 2 against the connecting member 22. Accordingly, the strap 2 tightened by the first tightening operation of the lever 6 is reliably held by the claw member 19.

Referring to FIG. 9 which represents a condition that the lever 6 is located at the release position, it is to noted that, although the lever 6 sinks, that is, move downwardly between the sidewalls 5a and 5b of the body 5, the lever 6 is slightly lifted above the lowermost position on which the lever 6 can be located when the straps 2 and 4 are loosened. This is because that, since the strap 2 is held by the body 5, namely by the claw member 19 and the connecting shaft 22, and become free from the lever 6, the tension given to the straps 2 and 4 acts on the pivot shafts 17a and 17b. Accordingly, the pivot shafts 17a and 17b, which is downwardly offset from the straight tension line T in FIGS. 7 and 11, is so urged as to become close to the tension line T so that the links 7a and 7b is lifted, with the result that the pivot shafts 14a and 14b are also lifted. Thus, the lever 6 rotates counterclockwise, therefore to the release direction thereof, due to the action of lifting of the pivot shafts 17a and 17b. Therefore, as shown in FIG. 9, the strap pressing shaft 12 is held at a sufficiently high position with respect to the strap turning shaft 12, so that the upper and lower portions 2b and 2a can be separated at the strap pressing shafts 12. Accordingly, as shown in FIG. 10, when the second end portion 2a of the strap 2 is pulled to tighten the portion of the strap 2 from the point nipped by the claw member 19 and the connecting shaft 22 to the second end portion 2a previously before the second tightening operation of the lever 6, since no friction between the upper and lower portions of the layered portion of the strap 2 effected, said operation for pulling the first end portion 2a of the strap 2 is quite light.

Subsequently, as shown in FIG. 11, when the lever 6 is again rotated clockwise to the tightening position, the second portion 2b of the strap 2 is pulled to the left so that the claw member 19 is rotated clockwise to release the lower portion 2b of the strap 2, accordingly, the straps 2 and 4 can be further tightened.

Figure 10:
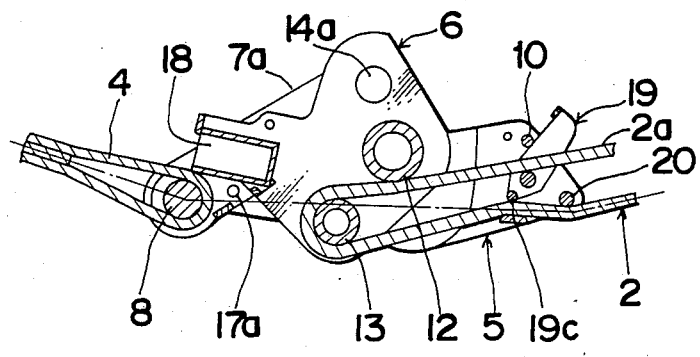
Figure 12:
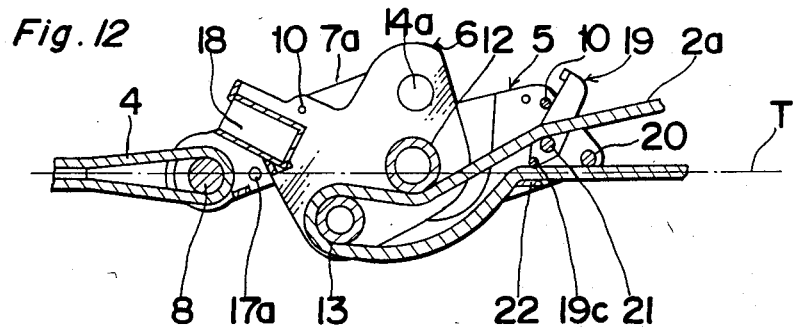
Figure 13:
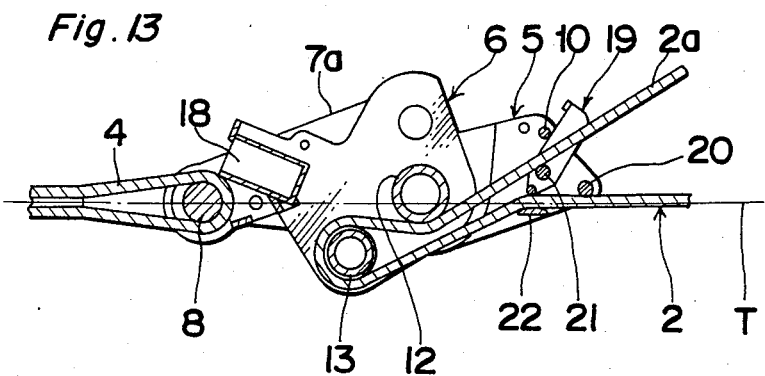
Figure 14:
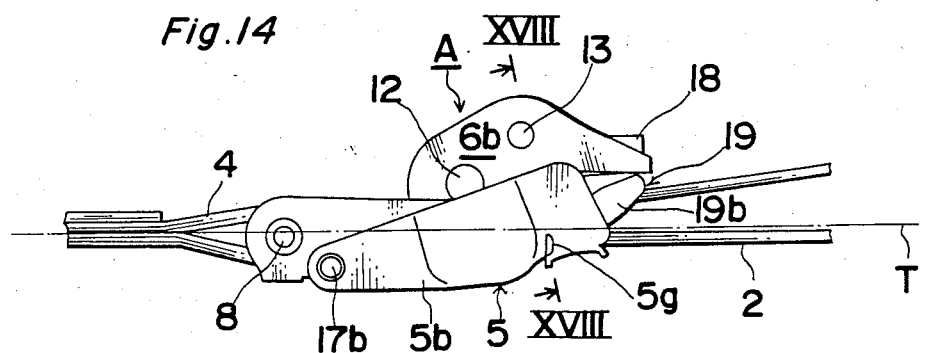
FIG. 14 is a partial side elevational view of a clasping device according to another embodiment of the present invention.

FIGS. 12 and 13 are illustrating the strap pulling operation before the additional tightening operation of the lever 6 and correspond to FIGS. 9 and 10. Referring to FIGS. 12 and 13, the straps 2 and 4 substantially align along the straight tension line T since the first increasingly tightening operation of the lever 6 has already effected, so that the pivot shafts 17a and 17b are substantially located on the tension line T. Therefore, when the lever 6 is located at the release position, as shown in FIG. 13, the lever 6 is held at a position higher than that as shown in FIGS. 9 and 10. Namely, the strap pressing shaft 12 is held at a position sufficiently higher than that of the strap turning shaft 13. Accordingly, the strap pulling operation before the second increasingly tightening operation of the lever 6 is also quite light.

It is apparent from the comparison with the operation of the lever of the prior clasping device as shown in FIG. 3 that, according to the present invention, the strap pulling operation is relatively light.

Referring to FIG. 3, which illustrates a condition in which the lever 6 is located at the release position, the lever 6 deeply sinks, that is, downwardly moves in the body 5 toward the lowermost position. Namely, the strap pressing shaft 12 and strap turning shaft 13 are located at substantially the same level, so that the upper portion and lower portion of the strap 2 are in contact with each other. Therefore, when the one end portion 2a of the strap 2 is pulled before the tightening operation of the lever 6, the strap pulling operation is extremely heavy since the frictional resistance of the upper and lower portions of the strap 2 is quite large.

Referring to FIGS. 14 to 18, which illustrate a second embodiment of the present invention, the claw member 19 has a further shaft, i.e. a release shaft 19e, which is mounted between the sideplates 19a and 19b and between the connecting shafts 21 and 19d. The release shaft 19e serves to facilitate the operation of releasing or loosening the strap 2. Namely, the operation of loosening the strap 2 can be easily conducted by providing the end portion 2a thereof close to and along the other end portion 2b so as to urge clockwise the release shaft 19e as shown in FIG. 17. It is to be noted that, when the end portion 2b moves to the right to be loosened, the claw member 19 is apt to press the end portion 2b against the connecting shaft 22 because the strap pressing bar 19c is retracted by the moving portion 2b. According to this second embodiment, the claw member 19 can be always held at the release position by urging the release shaft 19e clockwise by means of the end portion 2a of the strap 2, therefore, the operation of loosening the strap 2 can be facilitated.

Furthermore, according to the second embodiment, the connecting shaft 20 is arranged between the sidewalls 5a and 5b and left to the the connecting shaft 21. As apparent from the comparison with FIG. 10 showing the first embodiment, in the second embodiment, the pulling operation of the end portion 2a of the strap 2 before the increasingly tightening operation of the lever 6 is relatively light since the connecting shaft 20 is in contact with the strap 2. On the contrary to the above, according to the first embodiment, since the end portion 2b of the strap 2 is bent at two points, i.e, at both of the connecting shaft 20 and 22, as shown in FIG. 10, the operation of pulling the end portion 2a of the strap 2 is relatively heavy.

Still further, according to the second embodiment, each sidewalls 5a and 5b of the body 5 has, at a position adjacent to the connecting shaft 20, a strap guiding portion 5g projecting inwardly. Between the pair of strap guiding portions 5g, there is provided a narrow space for centering the portion 2b of the strap 2.

Figure 19A:
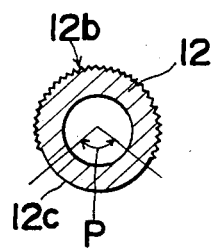
FIGS. 19a and 19b are sectional views illustrating modifications of the strap pressing shaft to be employed to the clasping devices shown the proceding drawings.
Figure 19B:
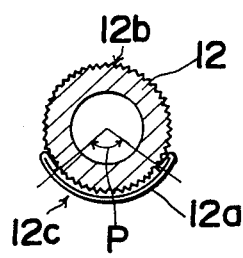
Figure 18:
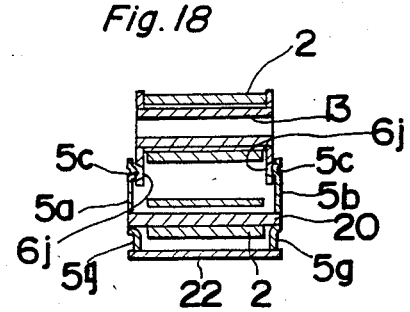

Referring to FIG. 19a which shows a modification of the strap pressing shaft 12, the shafts 12 has a cylindrical peripheral surface comprising a knurling surface zone 12b and a smooth surface zone 12c. The smooth surface zone 12c can be also obtained by mounting a cover plate 12a on the knurling surface 12a of the shaft 12, as shown in FIG. 19b. Meanwhile, referring to FIGS. 15 and 16, it is apparent that when the lever 6 is rotated, the strap pressing shaft 12 is simultaneously rotated. The part of the shaft 12, designated by an arrow P, is located on the left side with respect to the axis of the shaft 12 so as to be in no contact with the strap 2 when the lever 6 takes the tightening position as shown in FIG. 15, while the part P is located on the lower side so as to be contact with the strap 2 when the lever 6 takes the release position as shown in FIG. 16. Accordingly, the part P of the shaft 12 is arranged to be correspond to the smooth surface zone 12c. Therefore, in FIG. 16, the strap 2 can be easily moved because the friction of the strap 2 to the smooth surface zone 12c is relatively small. Meanwhile, in FIG. 16, the strap 2 can be efficiently held on the shaft 12 because the smooth surface zone 12c of the shaft 12 hardly contact the strap 2, but the knurling surface 12b mainly contact the strap 2.

Although the present invention has been fully described by way of example with reference to the accompanying drawings, it is to be noted, here, that various changes and modifications will be apparent to those skilled in the art. Therefore, unless otherwise such changes and modifications depart from the scope of the present invention, they should be construed as included therein.

What is claimed is:

1. In a clasping device which comprises a body having a pair of sidewalls facing each other,
   a lever having a pair of sidewalls facing each other, a strap turning shaft and strap pressing shaft respectively extending between the pair of sidewalls, and
   a pair of links respectively having first end portions pivotally connected, by means of pivot shafts, with the corresponding sidewalls of the lever at positions externally of the lever, second ends portions pivotally connected with first end portions of the corresponding sidewalls of the body at positions internally of the body, and adapted to be connected with a first hook connected by means a connecting member,
   a strap having a first end portion adapted to be connected with a second hook, a second end portion connected with the lever so as to be inserted between the pair of sidewalls of the lever externally, turned around the strap turning shaft after having past the strap pressing shaft and led to the outside past the strap pressing shaft,
   whereby, when the lever is turned from a release position to a tightening position, the strap turning shaft and the strap pressing shaft are turned around the pivot shafts to tighten the strap,
   the improvement comprising a first connecting shaft for connecting the second end portions of the links with the corresponding sidewalls of the body at predetermined positions,
   a shaft means for connecting the second end portions of the links with the corresponding sidewalls of the body at such positions between the first end portions of the links and the first connecting shaft that the shaft means takes a position offset from a substantially straight tension line, formed when the strap is tightened and passing through axes of the first connecting member and the pivot shafts, toward a side opposite to the other side where the strap pressing shaft locates when the lever takes the tightening position, a second connecting shaft extending between the pair of sidewalls of the body at second end portions opposite to the first end portion, and a claw member rotatably mounted on and between the pair of sidewalls of the body at the second end portions so that the strap passes through a space between the claw member and the second connectiong shaft and so that the claw member may rotate in a direction due to slight movement of the strap externally of the body so as to press the strap against the second connecting member to hold the strap therebetween.

2. A clasping device as claimed in claim 1, wherein the claw member comprises;

a third connecting shaft extending between the pair of side walls of the body at the second end portion thereof, a pair of sideplates rotatably mounted on the third connecting shaft, a strap pressing bar extending between the pair of sidewalls at first end portions thereof, and a pair of forth and fifth connecting members respectively extending between the pair of sidewalls at second end portions opposite to the first end positions with respect the third connecting shaft, the second end portion of the strap passing between the forth and fifth connecting members.

3. A clasping device as claimed in claim 1, wherein the strap pressing shaft has a cylindrical peripheral surface comprising a knurling surface zone for contacting the strap when the strap is tightened and a smooth surface zone for contacting the strap when the strap is released.

* * * * *